(12) United States Patent
Flamm et al.

(10) Patent No.: US 12,383,979 B2
(45) Date of Patent: Aug. 12, 2025

(54) SEGMENTED BEAM-SHAPING ELEMENT AND LASER PROCESSING INSTALLATION

(71) Applicant: TRUMPF Laser—und Systemtechnik GmbH, Ditzingen (DE)

(72) Inventors: Daniel Flamm, Ludwigsburg (DE); Keyou Chen, Tai Cang (CN)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 719 days.

(21) Appl. No.: 17/723,498

(22) Filed: Apr. 19, 2022

(65) Prior Publication Data

US 2022/0234135 A1 Jul. 28, 2022

Related U.S. Application Data

(63) Continuation of application No. PCT/EP2020/079570, filed on Oct. 21, 2020.

(30) Foreign Application Priority Data

Oct. 21, 2019 (DE) ...................... 10 2019 128 362.0

(51) Int. Cl.
*B23K 26/064* (2014.01)
*G02B 27/42* (2006.01)

(52) U.S. Cl.
CPC ........ *B23K 26/064* (2015.10); *G02B 27/4233* (2013.01)

(58) Field of Classification Search
CPC .. B23K 26/064; B23K 26/53; B23K 2103/54; B23K 26/0624; B23K 26/073;
(Continued)

(56) References Cited

U.S. PATENT DOCUMENTS 6,373,633 B1 * 4/2002 Brown ............... G02B 19/0014
 362/268
7,880,969 B2 * 2/2011 Wolf ................... G03F 7/70958
 359/621

(Continued)

FOREIGN PATENT DOCUMENTS

CN 107258040 A 10/2017
CN 110121398 A 8/2019
(Continued)

OTHER PUBLICATIONS

Daniel Flamm, Beam shaping for ultrafast materials processing, Oct. 24, 2020 (Year: 2020).*

(Continued)

*Primary Examiner* — Chris Q Liu
(74) *Attorney, Agent, or Firm* — LEYDIG VOIT & MAYER LTD.

(57) ABSTRACT

A diffractive optical element for imposing a phase distribution on a transverse beam profile of a laser beam includes surface elements that adjoin one another and form a sheet-like grating structure. Each surface element is assigned a phase shift value. The phase shift values define a two-dimensional phase distribution. The two-dimensional phase distribution has a beam center position, which defines a radial direction in the sheet-like grating structure. The surface elements are assigned to a plurality of angle segments. Each angle segment has an azimuthal segment width with respect to the beam center position. The phase shift values in the angle segments form radially symmetrical phase profiles respectively with respect to the beam center position. The radially symmetrical phase profiles form in the radial direction grating functions that have a same grating period. A segment grating phase is assigned to each of the grating functions.

18 Claims, 5 Drawing Sheets

(58) Field of Classification Search
CPC .. B23K 26/0648; B23K 26/066; B23K 26/04; B23K 26/042; B23K 26/046; B23K 26/06; B23K 26/0617; B23K 26/0622; B23K 26/0665; B23K 26/0673; B23K 26/0006; B23K 26/034; B23K 26/0652; B23K 26/0676; B23K 26/0884; B23K 26/24; B23K 26/38
USPC ...................................................... 219/121.6
See application file for complete search history.

(56) References Cited

U.S. PATENT DOCUMENTS

| | | | |
|---|---|---|---|
| 2008/0074746 A1* | 3/2008 | Cumme | G02B 27/0927 359/562 |
| 2008/0083886 A1* | 4/2008 | Faklis | G02B 27/0972 250/504 R |
| 2016/0004074 A1* | 1/2016 | Zhang | G02B 27/0081 359/223.1 |
| 2016/0266393 A1* | 9/2016 | Trela-Mcdonald | G02B 27/0025 |
| 2017/0252859 A1* | 9/2017 | Kumkar | B23K 26/06 |
| 2017/0259375 A1* | 9/2017 | Kumkar | B23K 26/064 |
| 2017/0276951 A1* | 9/2017 | Kumkar | B23K 26/066 |
| 2017/0346257 A1* | 11/2017 | Garnache-Creuillot | H01S 5/18319 |
| 2018/0062342 A1* | 3/2018 | Comstock | B23K 26/0624 |
| 2018/0117709 A1* | 5/2018 | Wetzig | B23K 26/082 |
| 2018/0236596 A1* | 8/2018 | Ihlemann | B23K 26/0006 |
| 2018/0345419 A1* | 12/2018 | Mikutis | B23K 26/0006 |
| 2019/0258067 A1* | 8/2019 | Suhara | B23K 26/0648 |
| 2019/0283178 A1* | 9/2019 | Mishchik | G02B 27/0927 |

FOREIGN PATENT DOCUMENTS

| | | |
|---|---|---|
| DE | 102017208979 A1 | 11/2018 |
| WO | WO 2016079062 A1 | 5/2016 |
| WO | WO 2016079063 A1 | 5/2016 |
| WO | WO 2016079275 A1 | 5/2016 |

OTHER PUBLICATIONS

Flamm, et al., "Beam Shaping for Ultrafast Materials Processing," *Laser Resonators, Microresonators, and Beam Control XXI, Proceedings of SPIE LASE*, Mar. 4, 2019, The International Society for Optics and Photonics, Bellingham, WA, USA.

Vijayakumar, et al., "Phase-Shifted Fresnel Axicon," *Optics Letters* 37, 11, pp. 1980-1982, Jun. 1, 2012, Optica Publishing Group, Washington DC, USA.

Zhu, et al., "Arbitrary Manipulation of Spatial Amplitude and Phase Using Phase-Only Spatial Light Modulators," *Scientific Reports* 4, 1, pages;:Dec. 11, 2014, Nature Portfolio, Berlin, Germany.

* cited by examiner

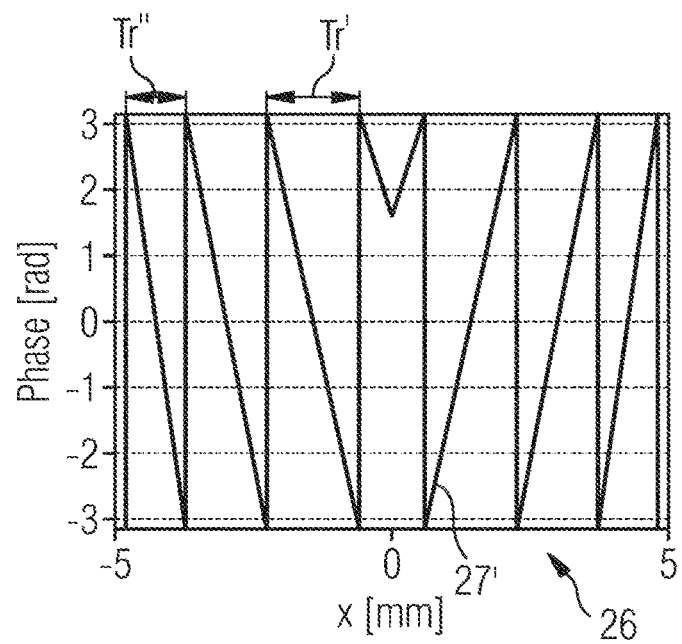

SEGMENTED BEAM-SHAPING ELEMENT AND LASER PROCESSING INSTALLATION

CROSS REFERENCE TO RELATED APPLICATIONS

This application is a continuation of International Application No. PCT/EP2020/079570 (WO 2021/078772 A1), filed on Oct. 21, 2020, and claims benefit to German Patent Application No. DE 10 2019 128 362.0, filed on Oct. 21, 2019. The aforementioned applications are hereby incorporated by reference herein.

FIELD

Embodiments of the present invention relate to a beam-shaping element for forming intensity zones free of diffraction in the direction of propagation. Embodiments of the present invention also relate to a laser processing installation with a beam-shaping element.

BACKGROUND

In transparent laser processing, laser radiation is used to create modifications in a material which is substantially transparent to the laser radiation and is referred to herein as transparent material. Absorption of the laser radiation that occurs in the volume of the material (volume absorption for short) can be used for example for drilling, for induced-voltage separation, for welding, for bringing about a modification of the refractive behavior or for selective laser etching of transparent materials. In this respect, see for example the applicant's applications WO 2016/079062 A1, WO 2016/079063 A1 and WO 2016/079275 A1.

In these fields of use, it can be important to be able to suitably check both a geometry and the nature of the modification in the material. Apart from parameters such as laser wavelength, pulse shape over time, number of pulses and pulse energy, the beam shape can be relevant here.

Thus, for example, ultrashort-pulse-laser-based glass modification processes for separating glass are often carried out with elongate focal distributions, such as there are for example in Bessel-like beam profiles. These can form elongate modifications in the material, which extend in the interior of the material in the direction of propagation of the laser radiation.

Beam-shaping elements and optical setups with which it is possible to provide slender beam profiles which are elongate in the direction of beam propagation and have a high aspect ratio for the laser processing are described for example in the cited WO 2016/079062 A1. For example, WO 2016/079062 A discloses the forming of beam profiles which change along the direction of propagation and may have a periodicity, for example a periodic intensity profile, along the Z axis.

SUMMARY

Embodiments of the present invention provide a diffractive optical element for imposing a phase distribution on a transverse beam profile of a laser beam. The diffractive optical element includes surface elements that adjoin one another and form a sheet-like grating structure. Each surface element is assigned a phase shift value. The phase shift values define a two-dimensional phase distribution. The two-dimensional phase distribution has a beam center position, which defines a radial direction in the sheet-like grating structure. The surface elements are assigned to a plurality of angle segments. Each angle segment has an azimuthal segment width with respect to the beam center position. The phase shift values in the angle segments form radially symmetrical phase profiles respectively with respect to the beam center position. The radially symmetrical phase profiles form in the radial direction grating functions that have a same grating period. A segment grating phase is assigned to each of the grating functions.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2C shows a representation of a radial phase profile with a grating period increasing in the radial direction.

DETAILED DESCRIPTION

Figure 1A:
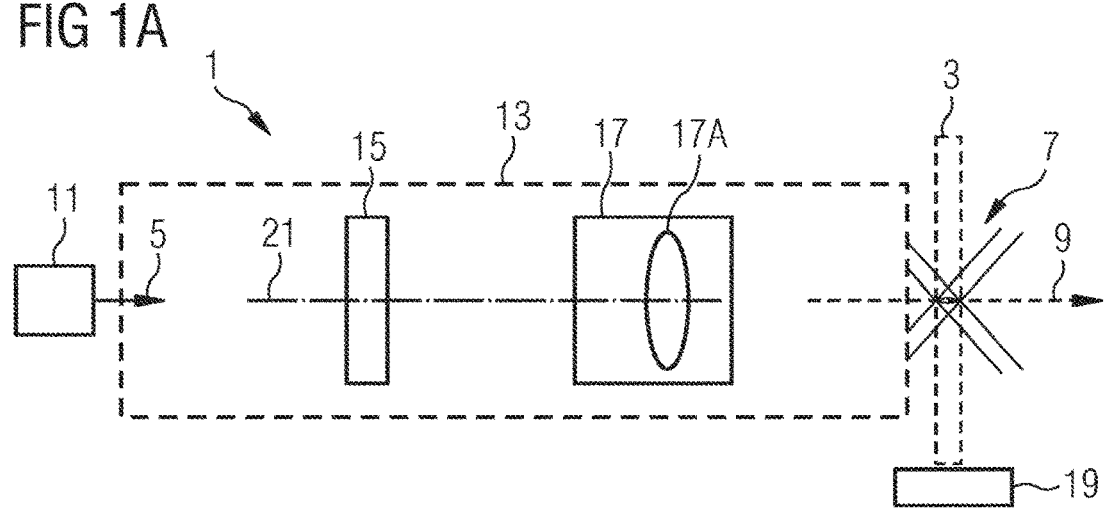
FIG. 1A shows a schematic diagram of a laser system with a beam-shaping element for processing a material with a focus zone of an elongate form.

One aspect of this disclosure provides a diffractive optical beam-shaping element which makes beam shaping possible for a tailored volume absorption. In particular, embodiments of the present disclosure provide for the processing of transparent materials (i.e. for the laser radiation of transparent materials) a beam-shaping element which can provide slender beam profiles which are elongate in the direction of beam propagation and have a high aspect ratio for the laser processing applications.

In one aspect, a diffractive optical-shaping element for imposing a phase distribution on a transverse beam profile of a laser beam comprises surface elements which adjoin one another and form a sheet-like grating structure. In the grating structure, each surface element is assigned a phase shift value and the phase shift values define a two-dimensional phase distribution. The two-dimensional phase distribution has a beam center position, which defines a radial direction in the sheet-like grating structure. The surface elements are assigned to a plurality of angle segments. Each angle segment has an azimuthal segment width with respect to the beam center position. The phase shift values in the angle segments form radially symmetrical phase profiles respectively with respect to the beam center position. The radially symmetrical phase profiles form in the radial direction grating functions that have a same grating period. Assigned to each of the grating functions is a segment grating phase, in particular with respect to the beam center position. The azimuthal segment widths of at least two adjacent angle segments differ. Alternatively or additionally, the segment grating phases of at least two adjacent angle segments have a segment grating phase difference of between 0 and 2n.

In a further aspect, a laser processing installation for processing a material with a laser beam by modifying the material in a focus zone which has an elongate form in a direction of propagation of the laser beam is disclosed. The laser processing installation comprises a laser beam source, which emits a laser beam, an optical system, which has a diffractive optical beam-shaping element as disclosed herein, and a beam-shaping and beam-guiding module with a focusing lens. The diffractive optical beam-shaping element is arranged in the beam path of the laser beam, in order to impose a two-dimensional phase distribution on the laser beam, and the two-dimensional phase distribution has the effect of forming the elongate focus zone in the material by focusing the laser beam with the focusing lens.

In some embodiments, the phase distribution may be formed point-symmetrically with respect to the beam center position. Furthermore, at least two angle segments may form identical radially symmetrical phase profiles with respect to the beam center position, it being possible for the angle segments to lie opposite one another, in particular with respect to the beam center position.

In some embodiments, the grating functions may each comprise a component of a sawtooth grating phase profile, it being possible for a gradient of a region of increase in each of the sawtooth grating phase profiles to correspond to a predetermined axicon angle assigned to the diffractive optical beam-shaping element. The predetermined axicon angle may lie in the range from 0.5° to 40° for creating a real Bessel-beam intermediate focus with the laser beam downstream in terms of the beam from the diffractive optical beam-shaping element or in the range from −0.5° to −40° for taking as a basis a virtual Bessel-beam intermediate focus upstream in terms of the beam from the diffractive optical beam-shaping element.

The azimuthal segment widths of the diffractive optical beam-shaping element may in some embodiments lie in the range from $2\pi/300$ to $\pi$. Optionally, each of the plurality of angle segments may have a same predetermined segment width.

In some embodiments, the two-dimensional phase distribution may be characterized by one or more axes of symmetry.

In some embodiments, the grating period may be formed as constant in the radial direction.

In some embodiments, the grating period may have an aspherical, preferably a quadratic and particularly preferably a linear profile in the radial direction. Alternatively or additionally, a collimation phase distribution which is formed radially symmetrically with respect to the beam center position over the plurality of angle segments may be integrated in the two-dimensional phase distribution.

In some embodiments of the laser processing installation, a beam center position of the diffractive optical beam-shaping element may be aligned with a beam center of a transverse beam profile of the laser beam.

Furthermore, the laser processing installation may comprise a workpiece holder, while providing a relative positionability of the beam-shaping and beam-guiding module and of a workpiece provided by the workpiece holder as material to be processed.

The concepts described herein concern in particular (three-dimensional) beam profiles, which have a diffraction-free (non-diffractive) form in the direction of propagation. Since no substantial change in the intensity is present in the beam profile along the direction of propagation, it is possible to create modifications in the material that are formed continuously in the direction of propagation.

Aspects described herein are based partly on the finding that the intensity profile formed periodically along the Z axis that is referred to at the beginning, such as occurs due to diffraction of the beam in the direction of propagation, can influence the formation of modifications during the laser processing. For example, material weakenings, such as can occur in the case of such intensity profiles, may lie too far apart from one another in the direction of propagation, with the result that the quality of a separating result may be influenced.

Correspondingly, the concepts disclosed herein are aimed at creating beam profiles that are free from diffraction in the direction of propagation (i.e. longitudinally). The inventors have recognized in this respect that, with a beam-shaping element, specific phase profiles can be imposed in a number of (azimuthal) angle segments. In this case, the segment-specific phase profiles are designed such that they together create a beam profile which is substantially free from diffraction in the direction of propagation. A diffraction-free formation can be achieved if phase profiles that have the same grating characteristic (for example a constant/radially identically changing "same" grating period) in the radial direction and differ in the radial phase profile in their "absolute phase", referred to herein as the segment grating phase $\Theta j$, by a segment grating phase difference ($\Delta\Theta j$ in FIG. 2B) are imposed in the angle segments. Here, the stipulation requiring the "same grating period" applies to the phase components for forming an elongate focus zone, such as are applied to the input beam respectively in a segment. The grating period may in this case also vary in the radial direction, for example when overlaying a lens, whereby the grating period can change aspherically, linearly or quadratically in the radial direction.

The inventors have also recognized that azimuthal widths of the segments and azimuthal positions of the segments can be varied for the shaping of a three-dimensional beam profile without losing the feature of being able to form a beam profile (a focusing distribution) without diffraction in the direction of propagation.

In this case, the azimuthal width of a segment (also referred to herein as the segment width) is the region of the azimuthal angle that is assigned to a segment. The segment width lies for example in the range from $2\pi/200$ to $\pi$. Each spatially defined segment is assigned a segment grating phase $\Theta j$. Furthermore, symmetry requirements, such as a point symmetry in relation to a center of the phase mask or such as one or more axes of symmetry, may be imposed on the phase distribution, with the result that segments correspond in their phase distribution. For example, in the case of point symmetry, opposite segments may have the same phase distributions. In the example of FIG. 4b, with a subdivision into 200 segments, because of the symmetry the number of segment grating phases $\Theta j$ to be determined was 50.

A position of a segment (also referred to herein as the segment position) can be specified for example by a central angle of the respective segment.

The use and exemplary embodiments of beam-shaping elements are described below in conjunction with FIGS. 1 to 4D.

FIG. 1 shows a schematic representation of a laser processing installation 1 for processing a material 3 by means of a laser beam 5. The processing brings about a modification of the material 3 in a focus zone 7. As indicated in FIG. 1A, the focus zone 7 may have a generally elongate form in a direction of propagation 9 of the laser beam 5. For example, the focus zone 7 is a focus zone of a Bessel beam or of an inverse Bessel beam, such as can be formed in a substantially transparent material.

The laser processing installation 1 comprises a laser beam source 11, which creates and emits the laser beam 5. The laser beam 5 is for example pulsed laser radiation. Laser pulses have for example pulse energies resulting in pulse peak intensities which bring about a volume absorption in the material 3 and therefore a formation of the modification in a desired geometry.

For the purpose of beam shaping and guidance, the laser processing installation 1 also comprises an optical system 13. The optical system 13, also known as the processing head, comprises a diffractive optical beam-shaping element 15 and a beam-shaping and beam-guiding module 17 with a focusing lens 17A.

Further beam-guiding components of the optical system 13, such as for example mirrors, lenses, telescope arrangements, filters, and control modules for aligning the various components, are not shown in FIG. 1A.

Finally, the laser processing installation 1 comprises a schematically indicated workpiece holder 19 for mounting a workpiece. In FIG. 1A, the workpiece is the material 3 to be processed. It may be for example a glass sheet or a sheet largely transparent to the laser wavelength used that has a ceramic or crystalline configuration (for example of sapphire or silicon). For the processing of the material 3, a relative movement is performed between the optical system 13 and the material 3, with the result that the focus zone 7 can be formed at various positions along a predetermined trajectory. For separating the material 3 into two parts, the trajectory then determines the profile of a separating line.

In general, the laser beam 5 is determined by beam parameters such as wavelength, spectral range, and pulse shape over time, formation of pulse groups, beam diameter, transverse beam profile/input intensity profile, transverse input phase profile, input divergence and/or polarization.

According to FIG. 1A, the laser beam 5 is supplied to the optical system 13 for the purpose of beam shaping, i.e. for converting one or more of the beam parameters. For the laser material processing, it will usually be the case that the laser beam 5 is approximately a collimated Gaussian beam with a transverse Gaussian intensity profile which is created by the laser beam source 11, for example an ultrashort-pulse high-power laser system. With regard to the laser radiation that can be used, reference is made by way of example to the laser systems and parameters described in the applicant's applications mentioned at the beginning.

Figure 2A:
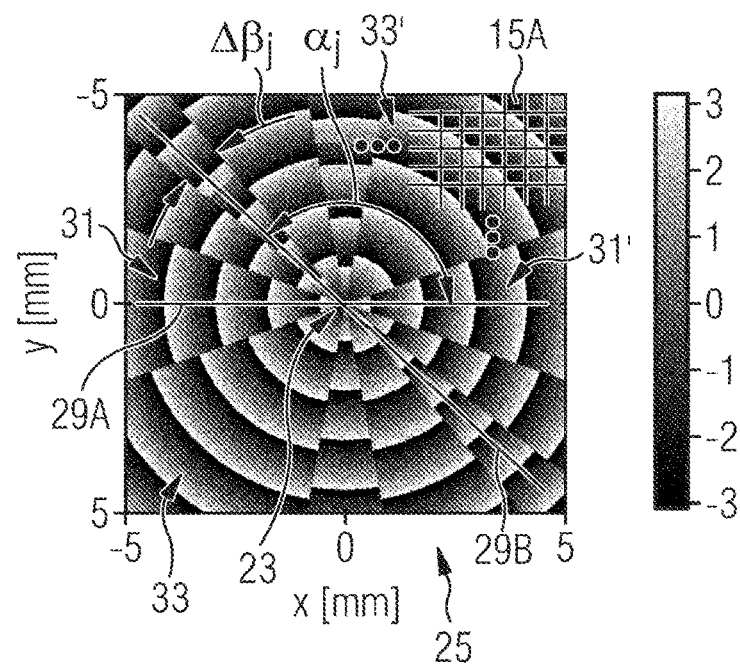
FIG. 2A shows a schematic representation of a two-dimensional phase distribution of a beam-shaping element which has a number of segments.

The optical system 13 is usually assigned an optical axis 21, which preferably runs through a point of symmetry of the beam-shaping element 15 (for example through a beam center position 23 of the diffractive optical beam-shaping element 15, see FIG. 2A). In the case of a rotationally symmetrical laser beam 5, a beam center of a transverse beam profile of the laser beam 5 along the optical axis 21 of the optical system 13 may be incident on the beam center position 23.

The beam-shaping element 15 is a spatial light modulator. It may for example be configured as a permanently inscribed diffractive optical element. It is also possible for the beam-shaping element 15 to be implemented electronically by setting a programmable diffractive optical element in a time-dependent manner (liquid crystal display (SLM spatial light modulator)). Beam-shaping elements of this type are usually digitalized beam-shaping elements which are designed to impose a phase profile on a transverse beam profile of a laser beam. In this respect, the digitalization may relate to the use of discrete values for the phase shift and/or the transverse grating structure.

In general, it is possible for a settable diffractive optical beam-shaping element to allow very fine phase changes along with a laterally coarser resolution, by contrast for example with a lithographically produced, permanently inscribed diffractive optical element. A permanently inscribed diffractive optical element may for example comprise plane-parallel steps, a material thickness in the region of a step determining the extent of a phase shift. The lithographic production of the plane-parallel steps can make a high lateral resolution possible.

Depending on the configuration of a beam-shaping element, it can be used in transmission or in reflection in order to impose a phase profile on a laser beam. It is generally possible to use the beam-shaping elements proposed herein for example in the applicant's optical setups described in the applications mentioned at the beginning. The underlying features are explained by way of example in conjunction with FIGS. 2A to 4D.

Structural beam-shaping elements that impose the phase and are of a sheet-like form are also referred to as phase masks, the masks relating to the phase of the two-dimensional phase distribution.

The two-dimensional phase distribution of the concepts disclosed herein is designed in particular for the creation of an elongate focus zone in the workpiece (after focusing with the focusing lens 17A).

Figure 1B:
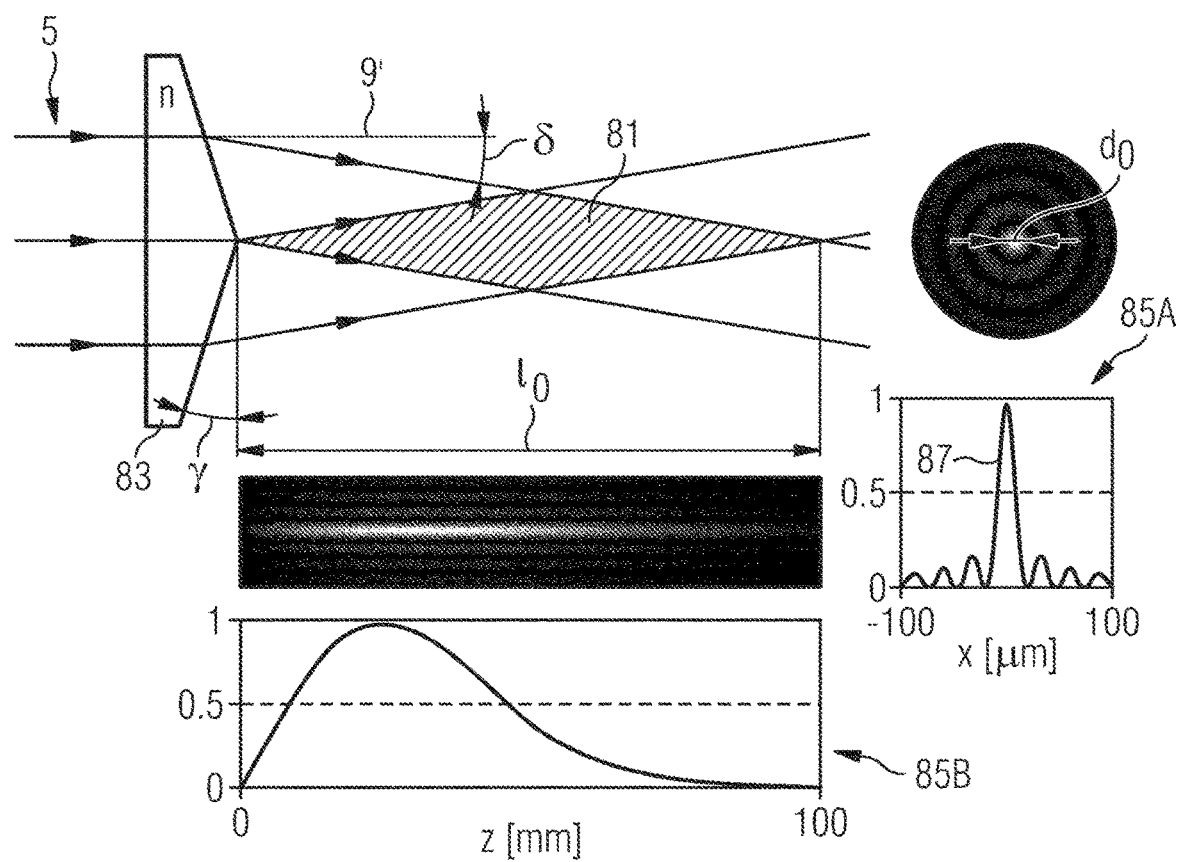
FIG. 1B shows a schematic diagram for illustrating the imposing of an axicon phase and a Bessel focus zone.

FIG. 1B illustrates in this respect the creation of a "real" Bessel-beam focus zone 81, such as can be reproduced in a workpiece for example with a telescope arrangement. For forming the Bessel-beam focus zone 81, a transverse axicon phase distribution is imposed on the laser beam 5. The axicon phase distribution corresponds to the phase that is transversely imposed on the incident beam 5 with a (rotationally symmetrical) axicon 83 of a material with a refractive index n. The axicon 83 is characterized by an axicon angle $\gamma$, which specifies the angle of the conically tapering axicon tip. A diffractive optical element can reproduce such axicon phase distributions with phase shift values correspondingly provided on surface elements (also see FIG. 2A).

FIG. 1B also shows an angle $\delta$ in relation to a direction of propagation 9' of the incident laser radiation, at which the (transverse) beam components are fed to the Bessel-beam focus zone 81. The angle $\delta$ depends on the axicon angle $\gamma$ and on the refractive index n. A maximum possible length $l_0$ of the Bessel-beam focus zone 81 is obtained from the beam diameter of the incident laser radiation and the angle $\delta$.

FIG. 1B also illustrates a resultant transverse intensity distribution 85A and also a longitudinal intensity distribution 85B, in each case in section and as an intensity profile through the beam axis (in the X direction) and along the beam axis (in the Z direction). A diameter $d_0$ of a main maximum 87 in the transverse intensity distribution 85A is also indicated by way of example.

As is shown in FIG. 1B, still before the focus zone is reproduced in the workpiece, a focus zone corresponds to a three-dimensional intensity distribution which determines the spatial extent of the interaction, and consequently the extent of the modification, in the material 3 to be processed. A fluence/intensity above the threshold fluence/intensity of this material that is relevant for the processing/modification is thus created as an elongate focus zone in a region in the material 3 that is elongate in the direction of propagation 9.

An elongate focus zone is usually referred to when the three-dimensional intensity distribution with regard to a target threshold intensity is characterized by an aspect ratio (extent in the direction of propagation in comparison with the lateral extent) of at least 10:1, for example 20:1 and more or 30:1 and more, for example 10000:1. An elongate focus zone of this type can result in a modification of the material with a similar aspect ratio. In some embodiments, (partial) focus zones which for example also run parallel to one another in the direction of propagation, each of which has a corresponding aspect ratio, may be formed. For the Bessel-beam focus zone 81 shown in FIG. 1B, the ratio of the longitudinal extent to the transverse extent of the main maximum 87 on the optical axis is given by $r0=2.405/k_r$, with $k_r=2*\pi/\lambda*(n-1)*\gamma$, where $\gamma$ is the axicon angle, $\lambda$ is the wavelength and n is the refractive index of the material of the axicon.

In particular with Bessel-beam profiles, it is possible for the energy to be introduced laterally into the elongate focus zone (in FIG. 1B at an angle $\delta$ to the direction of propagation 9' into the not yet reproduced Bessel-beam focus zone 81) for the volume absorption substantially over the entire length of a modification to be brought about. In this context, a Gaussian beam cannot create a comparable elongate focus, since the energy is supplied substantially longitudinally and not laterally.

Figure 2B:
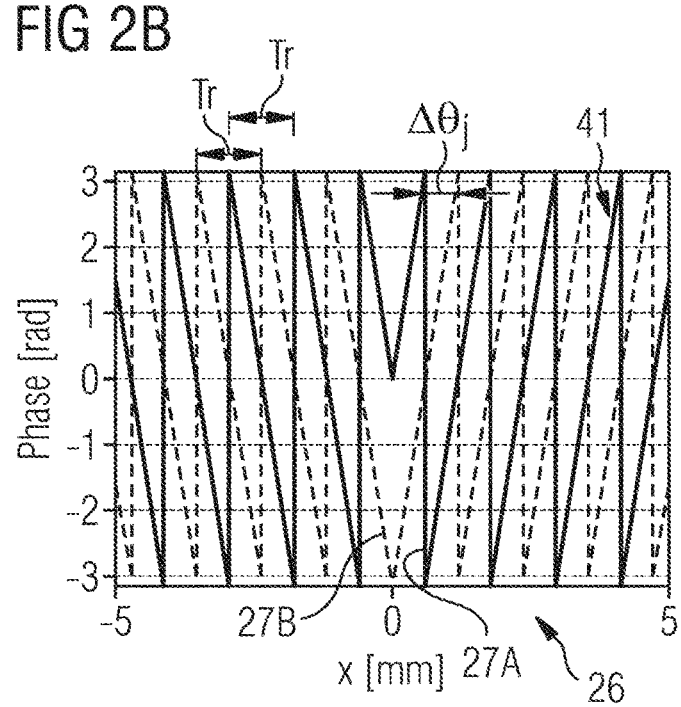
FIG. 2B shows a schematic comparative representation of two radial phase profiles of segments of the beam-shaping element from FIG. 2A.

Returning to the beam shaping, FIG. 2A schematically shows a two-dimensional phase distribution 25 of a diffractive optical beam-shaping element 15, such as can be imposed over a transverse beam profile with the diffractive optical beam-shaping element 15. FIG. 2B shows an associated graph 26 for illustrating radial phase profiles, such as are formed in the two-dimensional phase distribution 25 in the radial direction starting from the beam center position 23 of the diffractive optical beam-shaping element 15 in corresponding segments.

FIGS. 2A to 2B show the underlying phase shift values (phase in rad) from $-\pi$ to $+\pi$ in shades of gray and indicate them as a phase value. As explained below, the phase distribution 25 and the radial phase profiles have a sawtooth structure, given by way of example, for the reproduction of an axicon-like phase imposition.

The two-dimensional phase distribution 25 is segmented (divided) into a number of angle segments (also referred to below as the segment for short). The beam-shaping element 15 may—in the same way as an axicon that is modified as provided in embodiments of the present invention—be arranged in the beam path of the laser beam 5 for the purpose of imposing a phase in accordance with the two-dimensional phase distribution 25 onto the transverse beam profile of the laser beam 5.

FIG. 2A illustrates parameters of the two-dimensional phase distribution 25 and parameters of an assigned sheet-like grating structure, the sheet-like grating structure implementing the two-dimensional phase distribution 25.

The sheet-like grating structure is formed with the aid of surface elements 15A which adjoin one another and phase shift values assigned to them. Herein, the surface elements 15A refer to spatial structural units of the sheet-like grating structure which make it possible to bring about a preset phase shift for the impinging laser radiation in accordance with an assigned phase shift value. A surface element 15A correspondingly acts on a two-dimensional cutout of the transverse beam profile of the laser beam 15 and modifies the phase by the phase shift value. Surface elements correspond to the digitalization aspect previously mentioned. Exemplary surface elements 15A are indicated in FIG. 2A in the upper right-hand corner of the phase distribution 25, the size ratio between the surface elements, which are rectangular by way of example, and the phase dependence depending on the production of the beam-shaping element.

The surface elements 15A form a plurality of angle segments, which respectively show a uniform radial development of the phase (phase distribution) over the associated angle segment areas. The angle segments have in each case an azimuthal segment width with respect to the beam center position 23. In FIG. 2A, the azimuthal segment width is illustrated by an azimuthal angle range $\Delta\beta_j$ for an angle segment. The angle segment areas shown in FIG. 2A correspond to circular sector areas, which may be cropped in the outer peripheral region by the basic form of the beam-shaping element 15. Thus, by way of example, in FIG. 2A there is a quadratic basic form of the beam-shaping element 15.

For example, the azimuthal segment widths may lie in the range from $2\pi/300$ to $\pi$. Optionally, each of the plurality of angle segments may have a same predetermined segment width, for example an azimuthal angle range of $2\pi/200$.

Also depicted in the phase distribution 25 of FIG. 2A is the already mentioned beam center position 23, to which the center of the incident laser beam 5 is adjusted. The beam center position 23 defines radial directions in the sheet-like grating structure (in FIG. 2A in the plane of the drawing beginning at the beam center position 23), along which the radial phase profiles are present.

For the phase distribution 25 of FIG. 2A, FIG. 2B shows radial phase profiles 27A and 27B (as phase profile curves), which are formed by the profile of the phase shift values through in each case two opposite segments 31, 31' and 33, 33'. In particular, FIG. 2B shows the profile of the phase shift values along the X axis at Y=0 (line 29A in FIG. 2A belongs to the phase profile 27A) through the segments 31, 31' and the profile of the phase shift values through the segments 33, 33', which adjoin the segments 31, 31' (phase profile 27B). Both phase profiles 27A and 27B run through the beam center position 23 (X=0 and Y=0).

In the segments there are phase shift values which change in dependence on the radial distance r from the beam center position 23 according to an exemplary periodic function (for example a sawtooth grating). It can be seen that the phase profiles have a linear increase in the radial direction. In an angle segment, the phase shift values form with respect to the beam center position 23 a radially symmetrical phase profile, which in the radial direction can be assigned to grating functions. In other words, the phrase profiles 27A, 27B are rotationally symmetrical in portions. In the segments in FIG. 2B, the grating functions have the same grating period Tr in the radial direction and independently of the radial position.

Between two adjacent angle segments there may be a shift of the phases. This is indicated in FIG. 2B by way of example by a segment grating phase difference $\Delta\Theta_j$. The segment grating phase Θj may be indicated at the grating center position 23, for example with regard to a rotationally symmetrical grating, of which the phase is "zero" at an origin of the grating. By way of example, the segment grating phase Θj in FIG. 2B is "0" for the angle segments 31, 31' and "(−π)" for the angle segments 33, 33'. This corresponds to a segment grating phase difference ΔΘj of (−π) between the segment grating phases Θj of the adjacent angle segments 31 and 33 and between the adjacent angle segments 31' and 33'.

In some embodiments, the grating functions have (only) one component of a (radial) sawtooth grating phase profile with recurring regions of increase 41, in which the phase proceeds for example from (−π) to π (in a way corresponding to the linear phase change of an axicon, see FIG. 1B). That is to say that the component of the sawtooth grating phase profile is a first aspect discussed herein in the choice of the phase profile. Further components in the phase profile, which may be overlaid over the concepts disclosed herein, are possible.

As an example of integration of a further phase component, a phase component of a far field optical system, which in the optical system 13 is arranged downstream in terms of the beam from the beam-shaping element 15, may be included in the phase distribution. Thus, a collimation phase distribution which is formed for example radially symmetrically with respect to the beam center position over the plurality of angle segments may be integrated in the two-dimensional phase distribution. (Also see in this respect the applicant's applications mentioned at the beginning.)

In the graph 26' of FIG. 2C, an overlay of a sawtooth grating phase profile (axicon phase component) shown in FIG. 2B with a (rotationally symmetrical) lens phase component is illustrated. It can be seen that, in the case of a phase profile 27' through two opposite segments, a grating period increases with increasing radius (distance from the beam center position 23), i.e. Tr''<Tr'. The grating period in the radial direction may for example have an aspherical, preferably a quadratic and particularly preferably a linear profile, such as would be the case for example if a lens function were to be integrated.

If the radial dependence of the grating period is the same for all of the segments, the radially symmetrical phase profiles likewise form grating functions that have a same grating period in the radial direction in the various segments.

According to embodiments of the present invention, a gradient of a region of increase 41 in each of the sawtooth grating phase profiles may correspond to a predetermined axicon angle (axicon angle γ in FIG. 1B). The latter is assigned to the diffractive optical beam-shaping element 15 and determines the formation of the Bessel beam. The predetermined axicon angle may be for example in the range from 0.5° to 40° (typically in the range from 1° to 5°) for creating a real Bessel-beam intermediate focus with the laser beam downstream in terms of the beam from the diffractive optical beam-shaping element (31). For taking as a basis a virtual Bessel-beam intermediate focus upstream in terms of the beam from the diffractive optical beam-shaping element 15, the predetermined axicon angle may be for example in the range from −0.5° to −40° (typically in the range from −1° to)−5°.

For the implementation of the concepts disclosed herein, the azimuthal segment widths of at least two adjacent angle segments differ. Alternatively or additionally, the segment grating phases Θj of at least two adjacent angle segments have a segment grating phase difference ΔΘj of between 0 and 2π, in particular in the case of segment widths that are the same for all of the segments between 0 and π or between π and 2π. In some embodiments, additionally at least two adjacent angle segments may have a segment grating phase difference ΔΘj of π.

It can also be seen in FIG. 2A that, by way of example, the phase distribution 25 is formed point-symmetrically with respect to the beam center position 23. Furthermore, at least two angle segments, in particular that are opposite with respect to the beam center position 23, may form identical radially symmetrical phase profiles with respect to the beam center position 23. In general, the two-dimensional phase distribution may be characterized by one or more axes of symmetry; in FIG. 2A, axes of symmetry run along the X axis, the Y axis and through the diagonals of the quadratic basic form of the beam-shaping element.

As already mentioned, the beam-shaping systems may have different segment sizes, such as is determined for example by the azimuthal segment width (the azimuthal angle range Δβj). Furthermore, the azimuthal position of an angle segment (also referred to herein as the segment position) may vary, with the result that there are various possibilities for optimization. In FIG. 2A, a segment position for the segment with the azimuthal angle range Δβj is illustrated by an angle αj with respect to the X axis, i.e. the angle between the line 29A and the diagonal which runs for example through the center (in the azimuthal direction) of the segment as the line 29B in FIG. 2A.

The results described below with reference to FIGS. 3A to 3D and 4A to 4D in the creation of elongate diffraction-free focus zones should be understood as being given by way of example. It will be understood that, according to embodiments of the present invention, further focus distributions can be realized, in that the starting parameters such as the segment grating phase difference and optionally one or more of the parameters segment position, segment width and segment number are changed.

The concepts described herein can be generally represented as follows:

Quite generally, an ideally thin axicon modulates the input field with a radially symmetrical phase distribution with a linear increase: $\Phi^{axi}(r) = k_r \gamma$ ($k_r = 2*pi/Tr$ with Tr of the grating period of the sawtooth grating).

In this case, $k_r$ is given by the axicon angle γ, the refractive index n and the wavelength λ (assuming small-angle approximation: $k_r = 2\pi(n-1)\gamma/\lambda$ (see for example: J. Leach, G. M. Gibson, M. J. Padgett, E. Esposito, G. McConnell, A. J. Wright, and J. M. Girkin, "Generation of achromatic bessel beams using a compensated spatial light modulator," Opt. Express 14, 5581-5587 (2006))

The concepts disclosed herein maintain the radial dependence to ensure a focus zone that is free from diffraction in the direction of propagation, an azimuthal dependence being added by the formation of angle segments: $\Phi(r,\phi) = k_r \gamma + \Theta(\phi)$ The azimuthal dependence Θ(φ) can be chosen with regard to influencing the formation of the intensity regions, and may for example have jumps between segments. (In the case of infinitesimally small angle segments, ΔΘj become Θ(φ).) The azimuthal dependence in the angle segments may be determined by means of an optimizing algorithm for predefined target parameters. For example, the optimizing algorithm may be based on starting parameters such as the segment grating phase or the number and/or position of angle segments or moreover include one or more of these starting parameters in the optimization.

Shown thereafter in FIGS. 3A to 3D and 4A to 4D to illustrate the possibilities of the concepts proposed herein are two exemplary phase distributions on a beam-shaping element and resultant intensity distributions in a lateral section through the created focus zone and a section along the axial direction.

The starting point of the two exemplary phase distributions is that the angle segments have a same (grating) period of a radially symmetrical sawtooth grating.

Figure 3A:
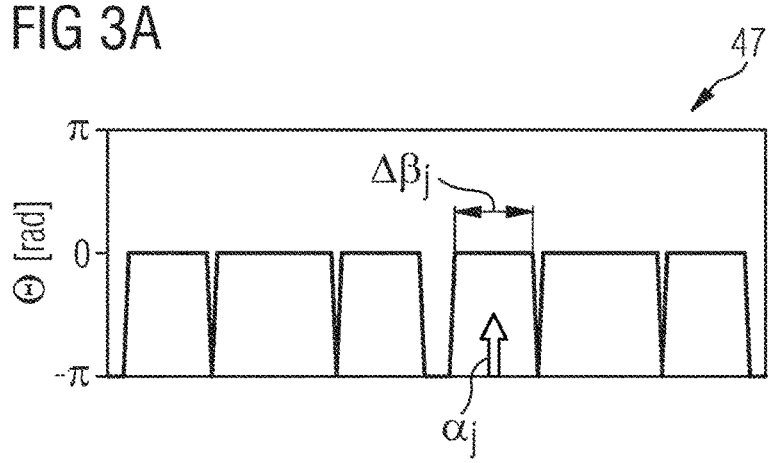
FIGS. 3A and 3B show figures for illustrating a two-dimensional phase distribution of a first example of a segmented beam-shaping element.
Figure 3B:
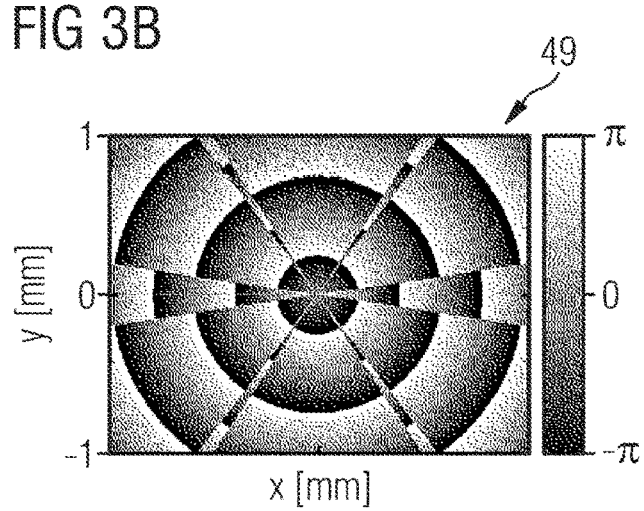

FIGS. 3A and 3B show an azimuthal distribution 47 of the segment grating phases $\Theta j$ and a two-dimensional phase distribution 49 of an exemplary beam-shaping element in which the azimuthal segment widths of the adjacent angle segments differ. In the sense of a "modified diffractive azicon" that is modified on the basis of the concepts disclosed herein, the two-dimensional phase distribution 49 is divided into j=12 angle segments. In each segment region, there is a radially symmetrical phase profile around a provided optical axis, here the beam center position 23 of the beam-shaping element, with a segment grating phase $\Theta j$. Consequently, the optical axes of the respective angle segments coincide. The angle segments alternately have segment grating phases $\Theta j$ of 0 and $(-\pi)$ and there are correspondingly segment grating phase differences $\Delta\Theta j$ of $\pi$ between adjacent angle segments.

A segment position at the angle $\alpha j$ and a segment width (angle region $\Delta\beta j$) are depicted in FIG. 3A by way of example for a segment.

Figure 3C:
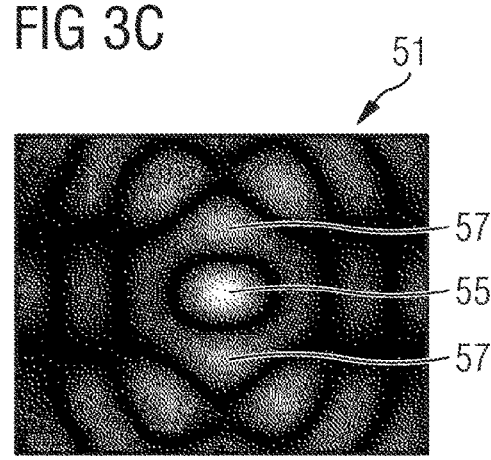
FIGS. 3C and 3D show calculated intensity distributions in space, such as can be created in a material by a phase distribution of FIG. 3A, FIGS. 4A and 4B show figures for illustrating a two-dimensional phase distribution of a second example of a segmented beam-shaping element
Figure 3D:
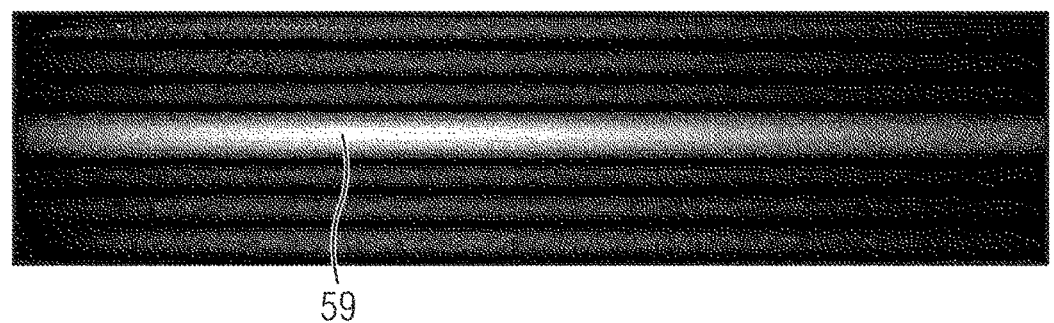

FIGS. 3C and 3D show a transverse intensity distribution (transverse beam profile 51) and a section along the direction of propagation (longitudinal beam profile 53) after focusing of the phase-imposed beam. The formation of a specially formed main maximum 55 and a number of secondary maxima 57 can be seen in the transverse beam profile 51. The secondary maxima 57 lie for example below a relevant threshold fluence/intensity of a material to be processed. In the longitudinal beam profile 53 there can be seen a formation of an elongate focus zone 59, which does not exhibit any diffraction effects along the direction of propagation.

Figure 4A:
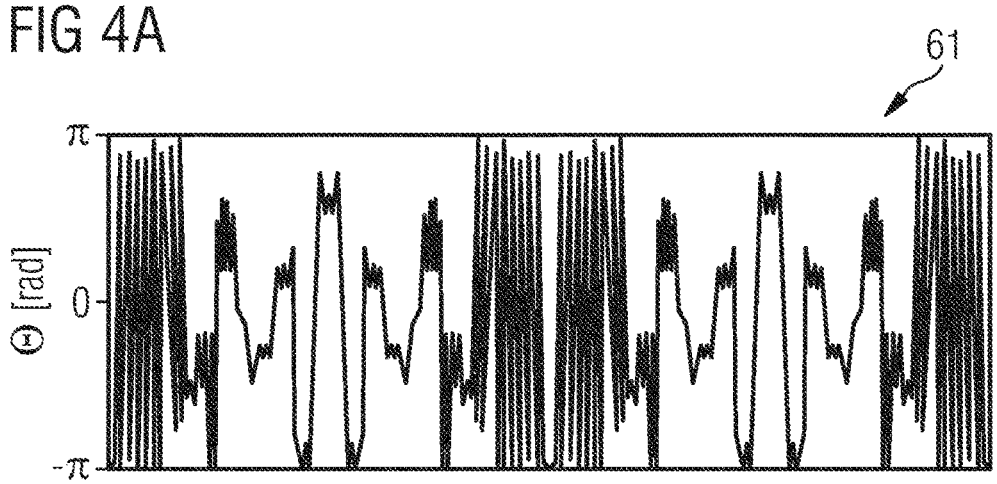
FIGS. 4C and 4D show calculated intensity distributions in space, as can be created in a material by a phase distribution of FIG. 4A.
Figure 4B:
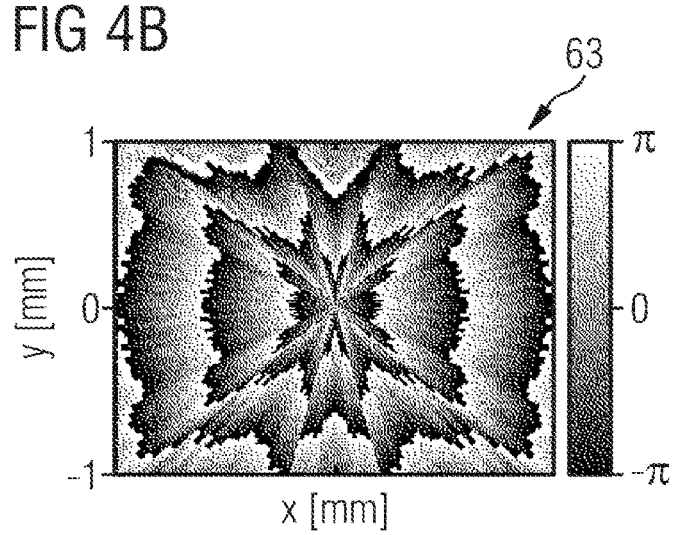

FIGS. 4A and 4B show an azimuthal distribution 61 of the segment grating phases $\Theta j$ and a two-dimensional phase distribution 63 of a further exemplary beam-shaping element in the case of which the segment grating phases $\Theta j$ of substantially all of the adjacent angle segments differ. There are segment grating phase differences $\Delta\Theta j$ of between 0 and $2\pi$ between adjacent angle segments, the azimuthal segment widths of all of the angle segments being the same. The two-dimensional phase distribution 63 is divided into j=200 angle segments. In each segment region there is a radially symmetrical phase profile about a provided optical axis, here the beam center position 23 of the beam-shaping element.

It can also be seen in FIG. 4A that the sawtooth gratings in the angle segments are distinguished by the same (identical) grating periods. In other words, the phase impositions in the angle segments respectively correspond to an axicon with the same axicon angle, but with a different phase contribution in the axicon tip. Correspondingly, the grating functions (phase profiles) are phase-shifted in relation to one another.

Figure 4C:
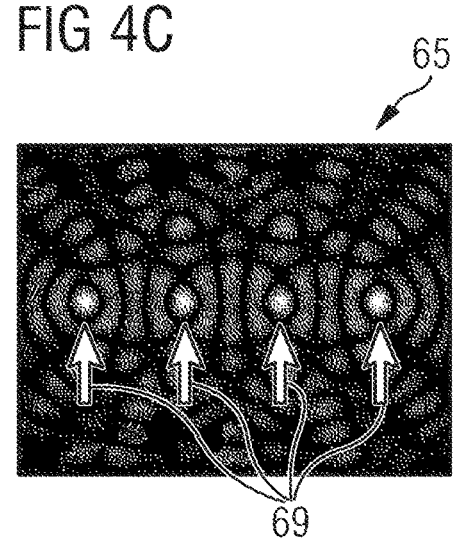
Figure 4D:
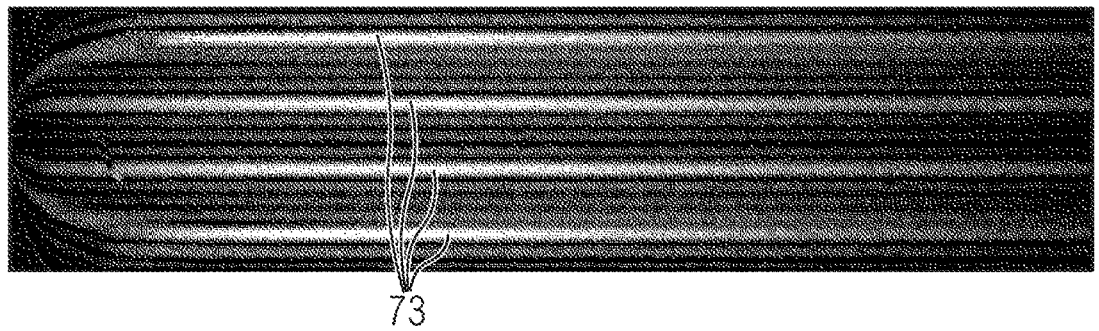

FIGS. 4C and 4D show a transverse intensity distribution (transverse beam profile 65) and a section along the direction of propagation (longitudinal beam profile 67) after focusing of the phase-imposed beam. The formation of four main maxima 69 in series, surrounded by a number of secondary maxima 71, can be seen in the transverse beam profile 65. The secondary maxima 71 again lie for example below a relevant threshold fluence/intensity of a material to be processed, with the result that four modifications linearly in series can be formed during the processing with a laser pulse. In the longitudinal beam profile 67, which intersects the four main maxima 69, four elongate focus zones 73, which do not exhibit any diffractive effects along the direction of propagation, can correspondingly be seen.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A diffractive optical element for imposing a phase distribution on a transverse beam profile of a laser beam, the diffractive optical element comprising:

a sheet-like grating structure comprising a plurality of surface elements that adjoin one another, wherein each surface element has a phase shift value, and the phase shift values define a two-dimensional phase distribution, wherein the two-dimensional phase distribution has a beam center position to be aligned with a center of a transverse beam profile of the laser beam, wherein the beam center position defines a radial direction in the sheet-like grating structure, the surface elements of the sheet-like grating structure form a plurality of angle segments, each of the plurality of angle segments has an azimuthal segment width with respect to the beam center position, the phase shift values of the surface elements in the plurality of angle segments form radially symmetrical phase profiles with respect to the beam center position, the radially symmetrical phase profiles form in a radial direction grating functions that have a same grating period, and each of the grating functions has a respective segment grating phase.

2. The diffractive optical element as claimed in claim 1, wherein:

the azimuthal segment widths of at least two adjacent angle segments differ.

3. The diffractive optical element as claimed in claim 1, wherein:
the segment grating phases of at least two adjacent angle segments have a segment grating phase difference of between 0 and 2π.

4. The diffractive optical element as claimed in claim 1, wherein the phase distribution is point-symmetrical with respect to the beam center position.

5. The diffractive optical element as claimed in claim 1, wherein at least two angle segments lying opposite one another with respect to the beam center position form identical radially symmetrical phase profiles with respect to the beam center position.

6. The diffractive optical element as claimed in claim 1, wherein each grating function comprises a component of a sawtooth grating phase profile, a gradient of a region of increase in each of the sawtooth grating phase profiles corresponding to a predetermined axicon angle of the diffractive optical element.

7. The diffractive optical element as claimed in claim 6, wherein the predetermined axicon angle
lies in the range from 0.5° to 40° for creating a real Bessel-beam intermediate focus with the laser beam downstream of the laser beam from the diffractive optical element, or
in the range from −0.5° to −40° for taking as a basis a virtual Bessel-beam intermediate focus upstream of the laser beam from the diffractive optical element.

8. The diffractive optical element as claimed in claim 1, wherein the azimuthal segment widths lie in the range from 2π/300 to π.

9. The diffractive optical element as claimed in claim 1, wherein each of the plurality of angle segments has a same predetermined segment width.

10. The diffractive optical element as claimed in claim 1, wherein the two-dimensional phase distribution is characterized by one or more axes of symmetry.

11. The diffractive optical element as claimed in claim 1, wherein the grating period is formed as constant in the radial direction.

12. The diffractive optical element as claimed in claim 1, wherein the grating period has an aspherical profile.

13. The diffractive optical element as claimed in claim 1, wherein the grating period has a quadratic profile.

14. The diffractive optical element as claimed in claim 1, wherein the grating period has a linear profile.

15. The diffractive optical element as claimed in claim 1, wherein a collimation phase distribution which is formed radially symmetrically with respect to the beam center position over the plurality of angle segments is integrated in the two-dimensional phase distribution.

16. A laser processing installation for processing a material with a laser beam, the laser processing installation comprising:
a laser beam source, configured to emit a laser beam, and
an optical system, comprising:
a diffractive optical element as claimed in claim 1, and
a beam-shaping and beam-guiding module with a focusing lens,
wherein the diffractive optical element is arranged in a beam path of the laser beam, in order to impose the two-dimensional phase distribution on the laser beam, and
wherein the two-dimensional phase distribution has an effect of forming an elongate focus zone in the material by focusing the laser beam with the focusing lens.

17. The laser processing installation as claimed in claim 16, wherein a beam center position of the diffractive optical element is aligned with a beam center of a transverse beam profile of the laser beam.

18. The laser processing installation as claimed in claim 16, further comprising:
a workpiece holder for providing a relative positionability of the beam-shaping and beam-guiding module, and
a workpiece as the material to be processed.

* * * * *